(12) United States Patent
Hughes (10) Patent No.: US 10,678,802 B2
(45) Date of Patent: Jun. 9, 2020

(54) LOG MANAGEMENT UTILIZING TIME CONTEXT INDEXING

(71) Applicant: INTERNATIONAL BUSINESS MACHINES CORPORATION, Armonk, NY (US)

(72) Inventor: Samuel D. Hughes, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 287 days.

(21) Appl. No.: 15/183,095

(22) Filed: Jun. 15, 2016

(65) Prior Publication Data

US 2017/0364565 A1    Dec. 21, 2017

(51) Int. Cl.
*G06F 16/2458* (2019.01)
*G06F 16/248* (2019.01)
*G06F 16/28* (2019.01)
*G06F 11/07* (2006.01)

(52) U.S. Cl.
CPC ...... *G06F 16/2477* (2019.01); *G06F 11/0787* (2013.01); *G06F 16/248* (2019.01); *G06F 16/287* (2019.01)

(58) Field of Classification Search
None
See application file for complete search history.

(56) References Cited

U.S. PATENT DOCUMENTS

| 8,429,463 B2 | 4/2013 | Tanaka |
| 2010/0115443 A1* | 5/2010 | Richstein ............ G06F 11/0769 |
| | | 715/771 |
| 2010/0251160 A1* | 9/2010 | Shafi ................... G06F 11/328 |
| | | 715/772 |

(Continued)

FOREIGN PATENT DOCUMENTS

| WO | 2007118096 A2 | 10/2007 |
| WO | 2010019288 A1 | 2/2010 |

OTHER PUBLICATIONS

Brooke Jackson. Outlook 2013:5 Hot New Features. Oct. 24, 2013.*

(Continued)

*Primary Examiner* — Tuankhanh D Phan
(74) *Attorney, Agent, or Firm* — Cantor Colburn LLP; Alexander Jochym (57) ABSTRACT

A method for displaying log records includes providing a plurality of log records wherein a respective log record has a time stamp identifying the time of an occurrence of a computer system event. A display index correlates a respective time threshold between consecutive log records with respective display line spacing. The method further includes accessing a plurality of consecutive log records from a log file and evaluating the gap in time of an occurrence between consecutive log records and comparing the respective gap in time with a respective time threshold of the display index to determine respective display line spacing for displaying consecutive log records. A display displays the plurality of log consecutive log records in segmented groups with each (Continued)

group separated by a display line spacing corresponding to a respective time threshold between consecutive records as identified by the display index.

7 Claims, 6 Drawing Sheets

(56) References Cited

U.S. PATENT DOCUMENTS

2015/0169288 A1    6/2015  Yamamoto et al.
2016/0070736 A1*  3/2016  Swan ................ G06F 17/30551
                                                            707/746

OTHER PUBLICATIONS

Anthony Chan et al., "An efficient format for nearly constant-time access to arbitrary time intervals in large trace files", Scientific Programming, vol. 16, 2008, pp. 155-165.

* cited by examiner

LOG MANAGEMENT UTILIZING TIME CONTEXT INDEXING

BACKGROUND

The present invention generally relates to the management of information contained within a log, and more particularly to managing information contained within a log to display the logged information in segmented groups relating to time context indexing.

SUMMARY

In accordance with an embodiment, a method for displaying log records is provided. The method includes providing a plurality of log records wherein a respective log record has a time stamp identifying the time of an occurrence of a computer system event. The method also includes providing a display index correlating a respective time threshold between consecutive log records with respective display line spacing for facilitating the display of consecutive log records utilizing a display. The method further includes accessing a plurality of consecutive log records from a log file and evaluating the gap in time of an occurrence between consecutive log records and comparing the respective gap in time with a respective time threshold of the display index to determine respective display line spacing for displaying consecutive log records. A display displays the plurality of log consecutive log records in segmented groups with each group separated by a display line spacing corresponding to a respective time threshold between consecutive records as identified by the display index.

In another embodiment of the invention, a system for displaying log records is provided. The system includes a log file stored in memory containing a plurality of log records associated with the operation of a computer system. Each log record includes a time stamp identifying the time of occurrence of a computer event. The system further includes a display index correlating a respective time threshold between consecutive log records with respective display line spacing for facilitating the display of consecutive log records utilizing a display. The system also includes a processor determining the time of an occurrence of a computer system event associated with a respective log record and evaluating the gap in the time of an occurrence between consecutive log records and comparing the respective gap in time with the respective time threshold of the display index to determine a respective display line spacing for displaying consecutive log records. A display displays the plurality of log records in segmented groups with each group separated by a display line corresponding to a respective time threshold between consecutive records.

In accordance with a further embodiment, a computer program product for displaying log records in a non-transitory storage medium readable by a processing circuit and storing instructions for execution by the processing circuit for performing a method is provided. The method includes providing a plurality of log records wherein a respective log record has a time stamp identifying the time of an occurrence of a computer system event. The method also includes providing a display index correlating a respective time threshold between consecutive log records with respective display line spacing for facilitating the display of consecutive log records utilizing a graphical user interface. The plurality of consecutive log records are accessed from the log file and determining the time of an occurrence of a computer system event associated with a respective log record is determined by the processing circuit and the gap in the time of an occurrence between consecutive log records is evaluated and compared with the respective gap in time with the respective time threshold of the display index to determine a respective display line spacing for displaying consecutive log records. The plurality of log records is displayed by a display in segmented groups with each group separated by a display line corresponding to a respective time threshold between consecutive log records.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The operation of computer systems incorporates the creation of log records for various purposes. A log file consists of log records which record computer activity. Logs records are append-only, totally-ordered sequence of records ordered by time. The log records are appended to the end of the log and assigned a unique consecutive log entry number. The log records have a specific purpose in recording what happens in the computer system and when. The log records are written by the operating system or other control program for such purposes as recording incoming dialogs, error and status messages and certain transaction details. The operational processing of certain routines may also be recorded to evaluate their processing times. Additionally, when debugging or trouble shooting the operation of a computer system, log records enable operators to evaluate the operation of the computer system to investigate the occurrence of abnormalities in the system's performance.

With the complexity of computer systems, the multitude of transactions processed has resulted in log files becoming increasingly large and in many cases unwelding. For instance, in certain systems, a maximum log file size may be set at 2 terabytes per log file and numerous log files may exist. Consequently, the presentation of the log file records for review by an operator should be done in a manner which enables the operator to easily discern the information contained in the log records.

Embodiments of the present disclosure present a novel log management system utilizing time context indexing. In exemplary embodiments, the log records are manipulated for being displayed in an easily readable format.

Figure 1:
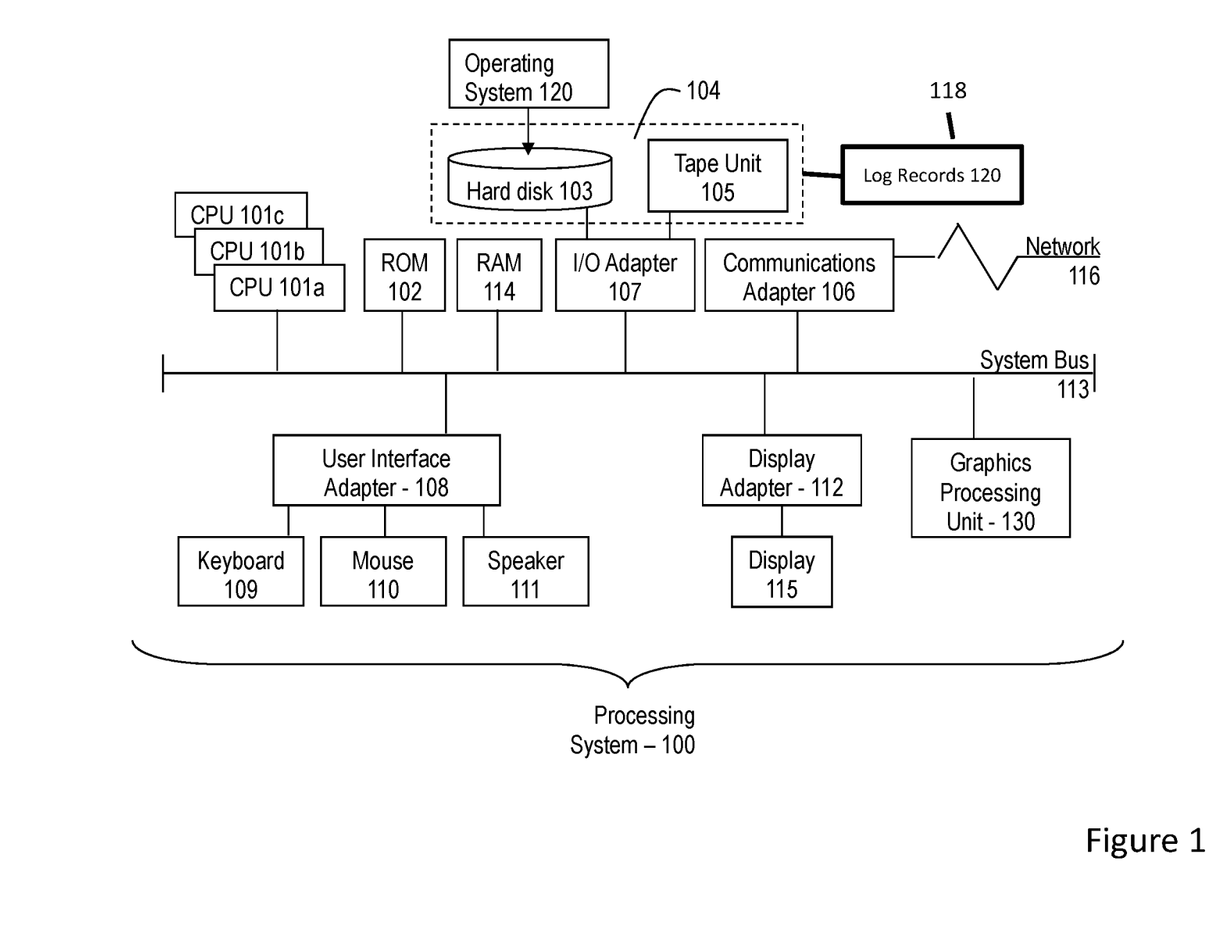
FIG. 1 is a block diagram illustrating one example of a processing system for practice of the teachings herein.

Referring to FIG. 1, there is shown an embodiment of a log management system 100 for implementing the teachings herein. In this embodiment, the system 100 has one or more central processing units (processors) 101*a*, 101*b*, 101*c*, etc.

(collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. A log file 118 is associated with mass storage 104 for storing log records 120.

Thus, as configured in FIG. 1, the log management system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

In exemplary embodiments, a log management system is provided that utilizes log files which contain a plurality of log records associated with the operation of a computer system. Each log record includes a time stamp identifying the time of occurrence of a computer event. A display index correlating a respective time threshold between consecutive log records with respective display line spacing is utilized for facilitating the display of consecutive log records in association with a display. The time of an occurrence of a computer system event associated with a respective log record is determined and the respective gap in time between consecutive log records is determined and compared with the respective time threshold of the display index to determine respective display line spacing for displaying consecutive log records. The plurality of log records is displayed by a display in segmented groups with each group separated by a display line corresponding to a respective time threshold between consecutive log records.

Figure 2:
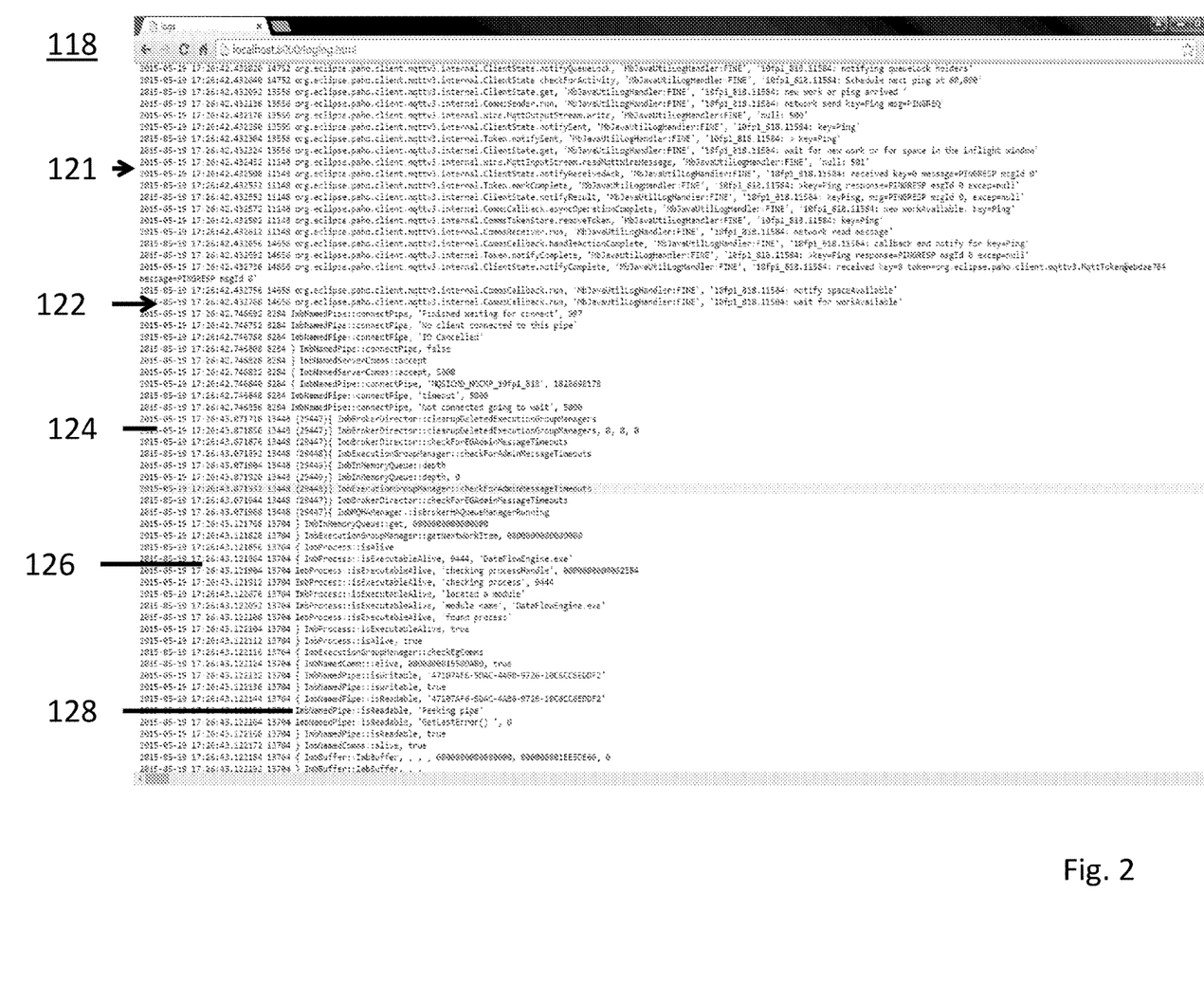
FIG. 2 is a representation of a standard log file.

As shown in FIG. 2, a standard log 118 includes a plurality of log records 121. The log records respectively consist of a time stamp 122. As shown, a typical time stamp includes a date section 124 which includes a year field, a month field, and a day field. A typical time stamp further includes a time section 126 which includes an hour field, a minute field, a second field and as shown a microsecond component. The log record further includes a thread component 128 which identifies a computer operation. As shown in FIG. 2, log records 122 are displayed consecutively in a line by line format. No delineation of the line by line format is presented tendering the display visually confusing.

Figure 3:
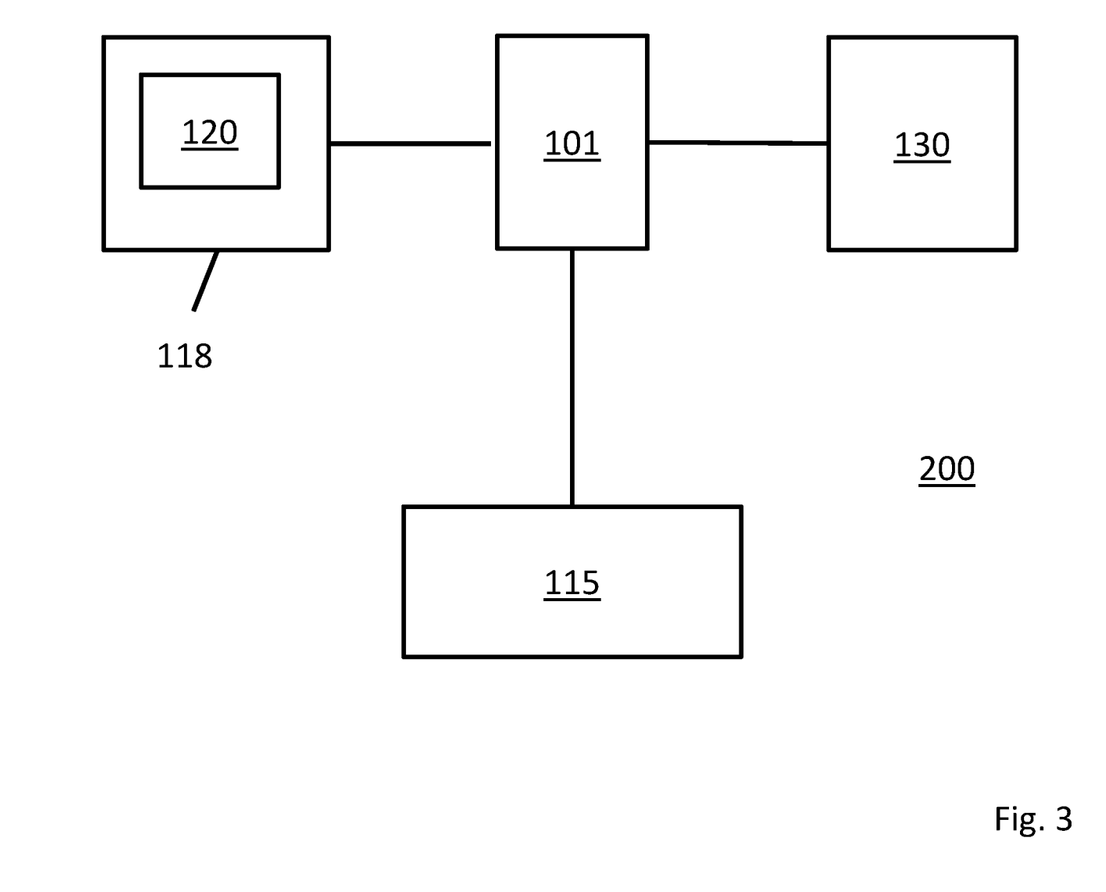
FIG. 3 shows a log management system in accordance with an embodiment.

Referring now to FIG. 3, a system 200 for managing log records with an embodiment is shown. As illustrated, the system 200 includes a log file 118 which contains a plurality of log records 121 associated with the operation of a computer system such as shown in FIG. 1. Each log record 121 includes a time stamp identifying the time of occurrence of a computer event. Display index 130 correlates a respective time threshold between consecutive log records with a respective display format criteria which designates display line spacing for the display of consecutive log records. Processor 101 communicates with log file 118 to retrieve and analyze log record 121 and associated time stamp. Processor 101 determines the time of an occurrence of a computer system event associated with a respective log record and evaluates the gap in the time of an occurrence between consecutive log records. Based on the time gap, the processor utilizes the display format criteria defined by display index 130 for displaying the consecutive log records in a prescribed display format via display 115.

Figure 4:
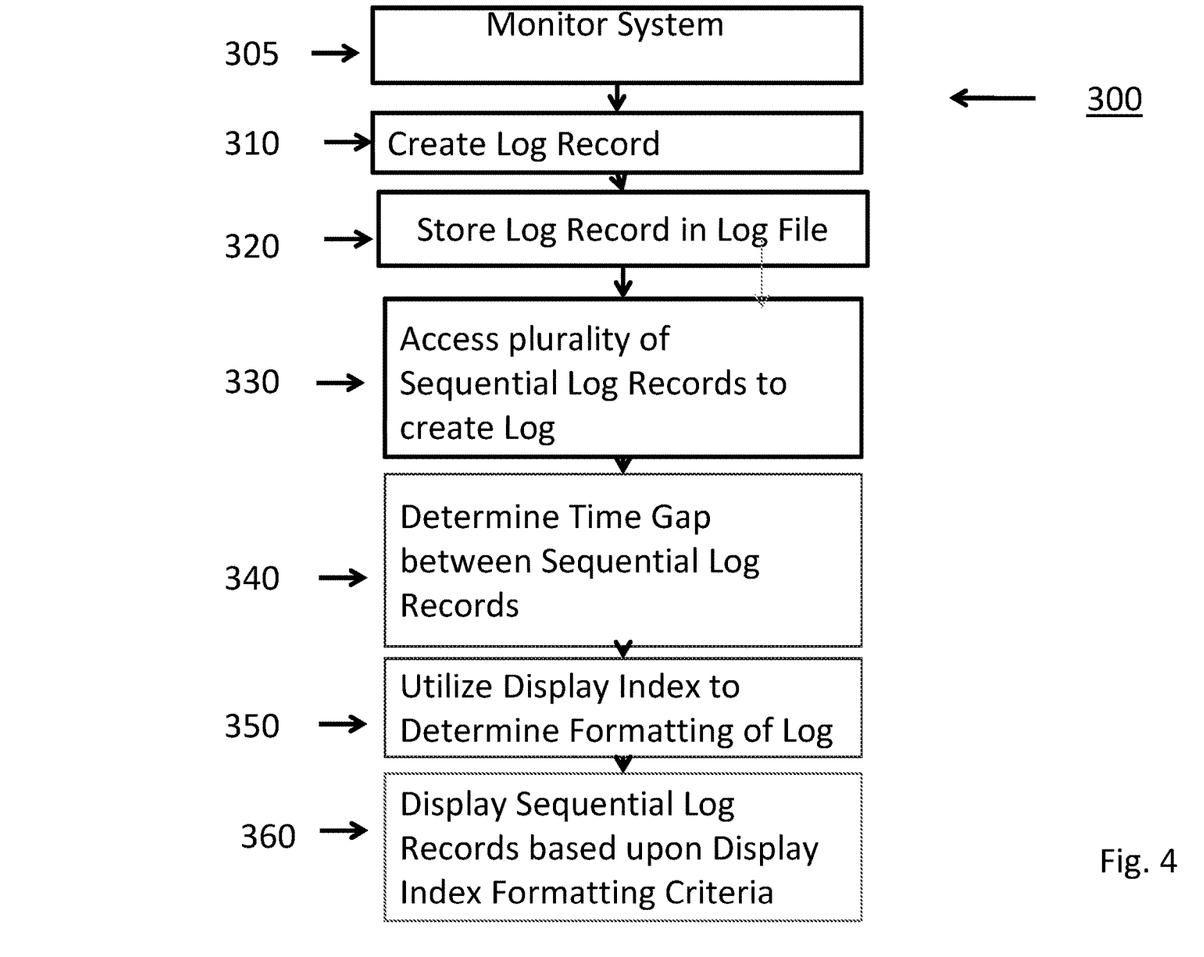
FIG. 4 shows a flow chart illustrating a method for displaying consecutive log records based upon an embodiment.

FIG. 4 illustrates a log management system 300 utilizing time context indexing. As shown at block 305, the operation of system 100 is monitored to identify the operations and activities of the respective computer system components. Based on the respective operations and activities a log record is created at block 310. The log record corresponds to the format identified in FIG. 2 wherein each log record includes a time stamp and an operational thread indicating the operation or activity which the system is undertaking at the particular time identified by the time stamp. Each respective log record is stored in a log file at block 320 consecutively based on the respective timestamp of the log record. Each computer system may have multiple log files containing log records corresponding with particular features of the computer system. The respective log records are accessed and retrieved at block 330 consecutively to create a log which may be reviewed by an operator.

To facilitate in the clarity of presenting the log for review by an operator, the log records are presented in a segmented manner for distinguishing operational activities which occur in a related timeframe. The timestamp of each log record is evaluated at block 340 to determine the time of occurrence of a computer system event as denoted by a respective log record and the time gap between consecutive log records is determined to evaluate if the log records occurred in a related timeframe. A display index is utilized at block 350 to determine the formatting of the visual representation of the log. The log records are displayed consecutively by the display at block 360 based on the formatting criteria defined by the display index and may be displayed in segmented groups based on the related timeframe of occurrence.

Figure 5:
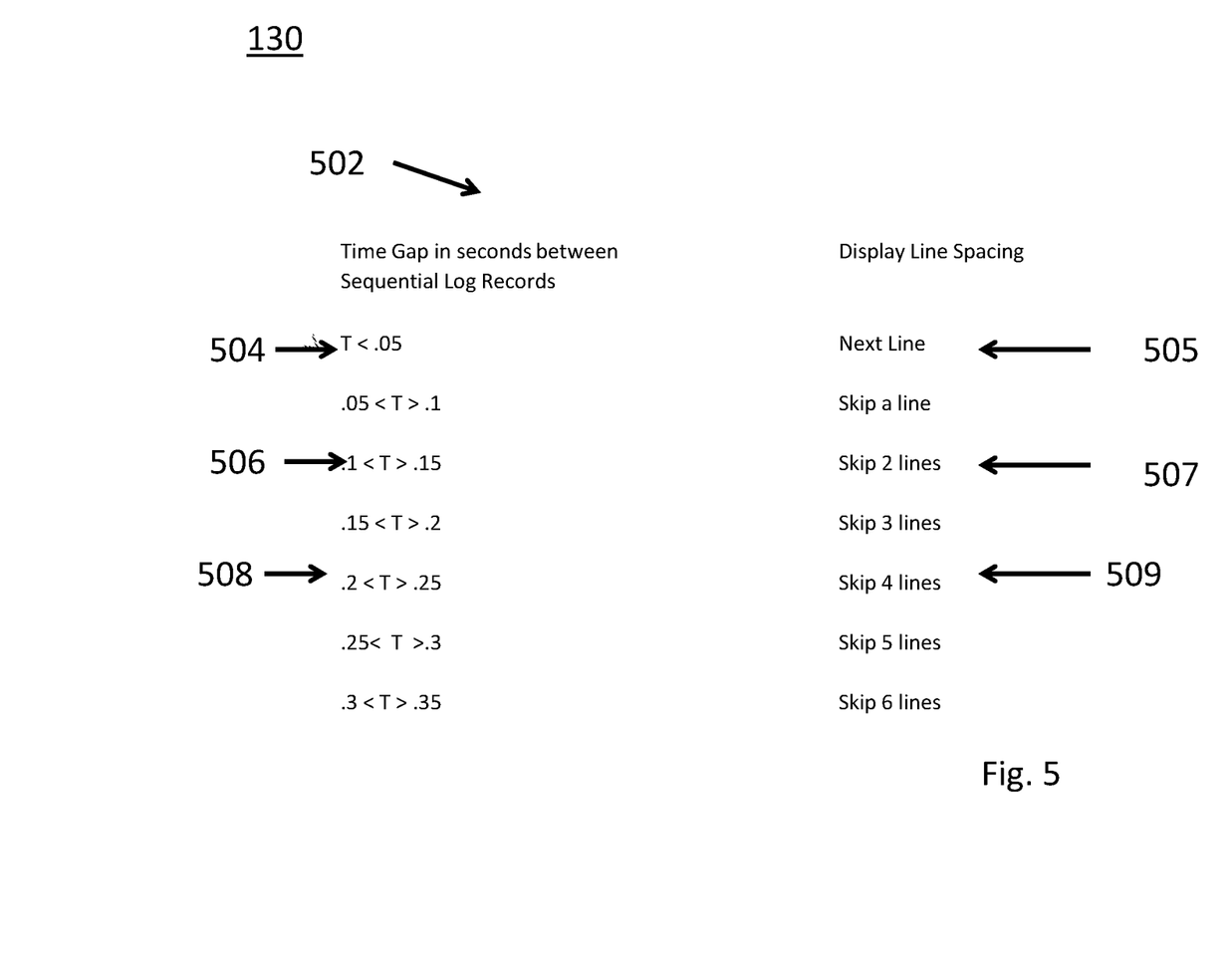
FIG. 5 shows a display index in accordance with an embodiment.

Referring now to FIG. 5, display index 130 includes formatting criteria 502 for the display of consecutive log records. Formatting criteria 502 utilizes the relationship between the time gaps in seconds between consecutive log records and provides corresponding display line spacing between the consecutive log records. Other time gap increments may be utilized. For example, the timestamp as shown in FIG. 2 includes a time measurement which includes microseconds enabling display index 130 to contain display line spacing criteria which could utilize time gaps between consecutive log records measured in microseconds. As shown in FIG. 5, the display index includes a first-time threshold 504 between consecutive log records based upon the respective time gaps of the consecutive log records and associated first line spacing 505. The display index is utilized for positioning consecutive log records with a time gap less than or equal to the first time threshold utilizing a line spacing associated with the first line spacing. The display index further includes a second-time threshold between consecutive log records 506 and an associated second line spacing 507. The second time threshold being greater than the first time threshold and the second line spacing being greater than the first line spacing. The display index 130 further includes a third-time threshold between consecutive log records 508 and an associated third line spacing 509. The third time threshold being greater than the first and second time thresholds and the third line spacing being greater than the first or second line spacing. In an alternative embodiment, the first, second and third line spacings may be scaled to each other. In an embodiment wherein the display includes a monitor, the first line spacing may include displaying consecutive log records in a horizontally adjacent format and the second line spacing includes displaying consecutive log records horizontally spaced apart a predetermined pixel gap and the third line spacing includes displaying consecutive log records horizontally spaced apart a predetermined pixel gap greater than the predetermined pixel gap corresponding with the second line spacing.

Figure 6:
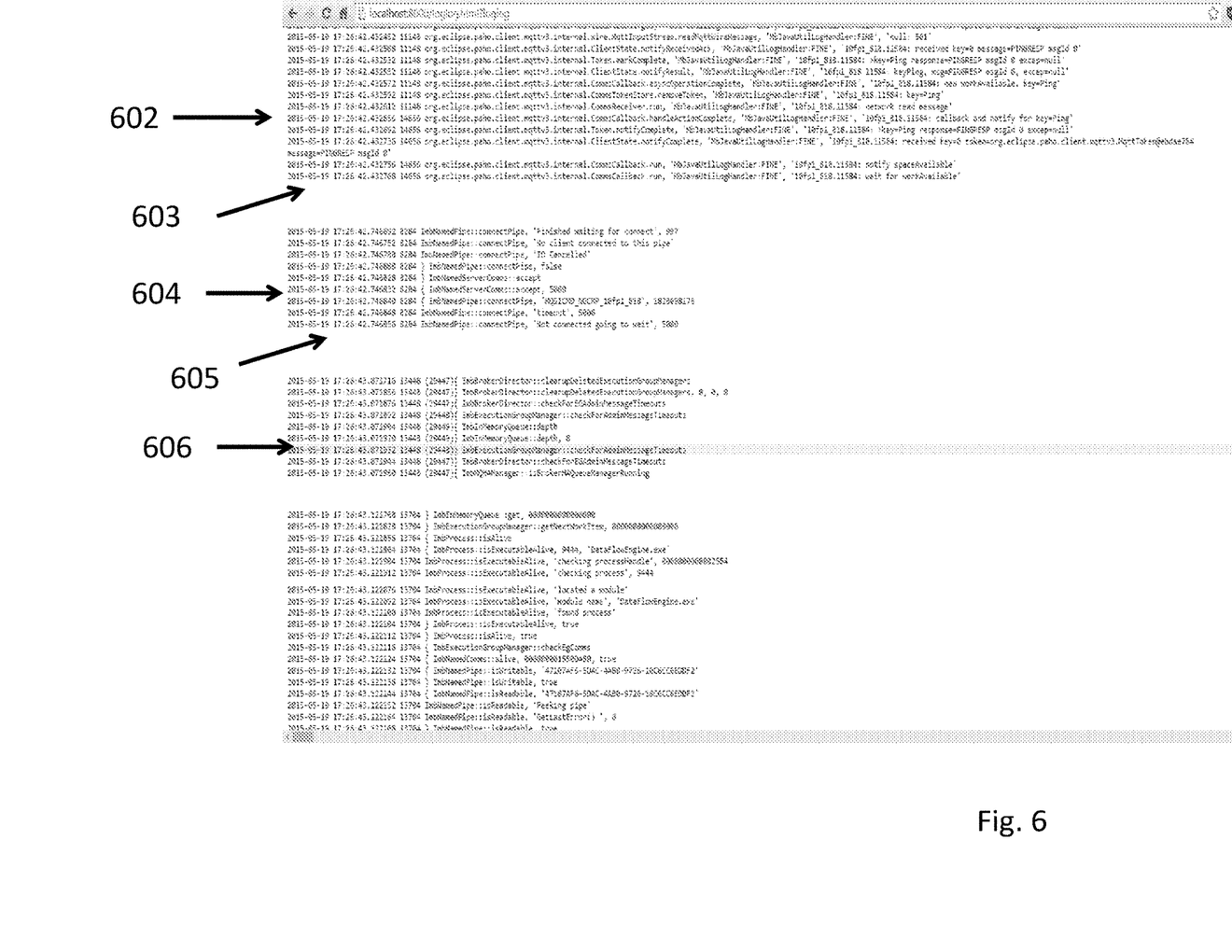
FIG. 6 shows a segmented log file according to an embodiment.

As shown in FIG. 6, a display displaying a segmented log file is shown. The segmented log file according to an embodiment includes a first segment 602 consisting of log records occurring within a predetermined timeframe according to the display index 130 which group these respective log records into a first segment. The second segment of log records 604 are displayed spaced apart from the first segment 602 by predetermined spacing 603 which corresponds to the time gap between the last log record of first segment 602 and the first log record of the second segment 604. Predetermined spacing 603 would be predefined by the display index 130 corresponding with the respective time gap. The third segment of log records 606 are displayed spaced apart from the second segment 604 by predetermined spacing 605 which corresponds to the time gap between the last log record of second segment 604 and the first log record of third segment 606. Predetermined spacing 605 would be predefined by the display index 130 corresponding with the respective time gap. The segmented manner of the log records easily identifies related groups of tasks.

In an illustrative example, the advantage of the embodiment as shown enables programmers and operators to debug software easily. From the segmented log records shown in FIG. 6, it may become readily apparent if patterns in the operation of the system exist. For instance, if an operating process or task slows down the processing of the system to the extent that the next operating task is not initiated until a significant time gap occurs, such delay in the operations would be readily seen by the segmented log. In particular, if the last log entry of a particular segment commonly contains the same thread, it may be apparent that that particular thread or task is responsible in delaying the operation of the system and requires investigation. Furthermore, other operational patterns which result in the delay of subsequent operations may be more readily apparent from the visually segmented display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for displaying log records comprising:
   providing a plurality of log records wherein a respective log record has a time stamp identifying the time of an occurrence of a computer system event and a thread component which identifies a computer operation regarding system performance;
   providing a display index correlating a respective time threshold between consecutive log records with a respective display line spacing for facilitating display of consecutive log records utilizing a display;
   accessing a plurality of consecutive log records from a log file and evaluating a gap in the time of an occurrence between consecutive log records and comparing the respective gap in time with the respective time threshold of the display index to determine a respective display line spacing for displaying consecutive log records; and
   utilizing a display for displaying said plurality of log records in segmented groups with each group separated by a number of display lines corresponding to a respective time threshold between consecutive log records,
   wherein the display index includes a first time threshold between consecutive log records and an associated first line spacing for positioning consecutive log records with a time gap less than or equal to the first time threshold within a line spacing associated with to the first line spacing,
   wherein the display index further includes a second time threshold between consecutive log records and an associated second line spacing for positioning consecutive log records with a time gap less than or equal to the second time threshold and greater than the first time threshold, the second line spacing being greater than the first line spacing,
   wherein the first, second and third line spacings are scaled with respect to each other such that the larger the duration of time gap between consecutive records the larger the line spacing between consecutive records providing varying visual differentiation between segmented groups of consecutive records, and
   wherein the display includes a monitor and the first line spacing includes displaying consecutive log records in a horizontally adjacent format and the second line spacing includes displaying consecutive log records horizontally spaced apart a predetermined pixel gap and the third line spacing includes displaying consecutive log records horizontally spaced apart a predetermined pixel gap greater than the predetermined pixel gap corresponding with the second line spacing.

2. The method of claim 1 wherein the display index further includes a third time threshold between consecutive log records and an associated third line spacing for positioning consecutive log records with a time gap less than or equal to the third time threshold and greater than the first time and second threshold, the third line spacing being greater than the first or second line spacing.

3. The method of claim 1 wherein the log records includes a time component measured to microseconds and a thread component identifying a system operation.

4. A system comprising:
   a log file containing a plurality of log records associated with an operation of a computer system;
   each log record including a time stamp identifying a time of occurrence of a computer event and a thread component which identifies a computer operation regarding system performance;
   a display index correlating a respective time threshold between consecutive log records with a respective display line spacing for facilitating display of consecutive log records utilizing a graphical user interface;

a processor determining the time of an occurrence of a computer system event associated with a respective log record and evaluating the gap in the time of an occurrence between consecutive log records and comparing the respective gap in time with the respective time threshold of the display index to determine a respective display line spacing for displaying consecutive log records; and a display for displaying the plurality of log records in segmented groups with each group separated by a number of display lines corresponding to a respective time threshold between consecutive log records, wherein the display index includes a first time threshold between consecutive log records and an associated first line spacing for positioning consecutive log records with a time gap less than or equal to the first time threshold within a line spacing associated with to the first line spacing, wherein the display index further includes a second time threshold between consecutive log records and an associated second line spacing for positioning consecutive log records with a time gap less than or equal to the second time threshold and greater than the first time threshold, the second line spacing being greater than the first line spacing, wherein the first, second and third line spacings are scaled with respect to each other such that the larger the duration of time gap between consecutive records the larger the line spacing between consecutive records providing varying visual differentiation between segmented groups of consecutive records, and wherein the display includes a monitor and the first line spacing includes displaying consecutive log records in a horizontally adjacent format and the second line spacing includes displaying consecutive log records horizontally spaced apart a predetermined pixel gap and the third line spacing includes displaying consecutive log records horizontally spaced apart a predetermined pixel gap greater than the predetermined pixel gap corresponding with the second line spacing.

5. The system of claim 4 wherein the display index further includes a third time threshold between consecutive log records and an associated third line spacing for positioning consecutive log records with a time gap less than or equal to the third time threshold and greater than the first time and second threshold, the third line spacing being greater than the first or second line spacing.

6. The system of claim 4 wherein the log records includes a time component measured to microseconds and a thread component identifying a system operation.

7. A computer program product for displaying log records a non-transitory storage medium readable by a processing circuit and storing instructions for execution by the processing circuit for performing a method, said method comprising:

providing a plurality of log records wherein a respective log record has a time stamp identifying the time of an occurrence of a computer system event and a thread component which identifies a computer operation regarding system performance;

accessing a plurality of consecutive log records from a log file;

providing a display index correlating a respective time threshold between consecutive log records with a respective display line spacing for facilitating display of consecutive log records utilizing a graphical user interface;

determining the time of an occurrence of a computer system event associated with a respective log record;

evaluating the gap in the time of an occurrence between consecutive log records and comparing the respective gap in time with the respective time threshold of the display index to determine a respective display line spacing for displaying consecutive log records; and utilizing a display for displaying said plurality of log records in segmented groups with each group separated by a number of display lines corresponding to a respective time threshold between consecutive log records, wherein the display index includes a first time threshold between consecutive log records and an associated first line spacing for positioning consecutive log records with a time gap less than or equal to the first time threshold within a line spacing associated with to the first line spacing, wherein the display index further includes a second time threshold between consecutive log records and an associated second line spacing for positioning consecutive log records with a time gap less than or equal to the second time threshold and greater than the first time threshold, the second line spacing being greater than the first line spacing, wherein the first, second and third line spacings are scaled with respect to each other such that the larger the duration of time gap between consecutive records the larger the line spacing between consecutive records providing varying visual differentiation between segmented groups of consecutive records, and wherein the display includes a monitor and the first line spacing includes displaying consecutive log records in a horizontally adjacent format and the second line spacing includes displaying consecutive log records horizontally spaced apart a predetermined pixel gap and the third line spacing includes displaying consecutive log records horizontally spaced apart a predetermined pixel gap greater than the predetermined pixel gap corresponding with the second line spacing.

\* \* \* \* \*